(12) United States Patent
Ishigami et al.

(10) Patent No.: US 7,294,821 B2
(45) Date of Patent: Nov. 13, 2007

(54) OPTICAL MODULE

(75) Inventors: Yoshiaki Ishigami, Hitachi (JP); Ryuta Takahashi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/516,051

(22) Filed: Sep. 6, 2006

(65) Prior Publication Data

US 2007/0057163 A1    Mar. 15, 2007

(30) Foreign Application Priority Data

Nov. 9, 2005   (JP)  ............................... 2005-324833

(51) Int. Cl.
*H01J 3/14*   (2006.01)
*H01J 5/16*   (2006.01)
*H01J 40/14*  (2006.01)

(52) U.S. Cl. ..................................... 250/216
(58) Field of Classification Search ................ 250/216, 250/221

See application file for complete search history.

(56) References Cited

U.S. PATENT DOCUMENTS 5,997,185 A   12/1999   Kropp

| | | | |
|---|---|---|---|
| 6,741,777 B2 * | 5/2004 | Jewell et al. | 385/49 |
| 7,030,365 B2 * | 4/2006 | Langland | 250/221 |
| 2006/0131487 A1 * | 6/2006 | Mathis et al. | 250/221 |
| 2006/0249661 A1 * | 11/2006 | Ishigami et al. | 250/216 |

FOREIGN PATENT DOCUMENTS

JP    2002-107582    4/2002

* cited by examiner

*Primary Examiner*—Georgia Epps
*Assistant Examiner*—Suezu Ellis
(74) *Attorney, Agent, or Firm*—McGinn IP Law Group, PLLC (57) ABSTRACT

An optical module has a convex lens interposed between a mirror and a light-emitting element array, and whose effective diameter is larger than the distance between the respective optical axes of mutually most-distant two light-emitting elements of the light-emitting element array. The convex lens causes incident optical signals from light-emitting elements of the light-emitting element array to respectively form parallel light, and causes their respective optical axes to cross each other on or adjacent to the surface of the mirror, to emit plural optical signals reflected off the mirror, and make the respective optical axes of the emitted optical signals parallel to each other to collect the parallel optical signals into monitoring light-receiving elements respectively.

8 Claims, 8 Drawing Sheets

OPTICAL MODULE

The present application is based on Japanese patent application No. 2005-324833, the entire contents of which are incorporated herein by reference.

BACKGROUND OF THE INVENTION

1. Field of the Invention

The present invention relates to an optical module for transmitting or receiving plural optical signals, and particularly, to an optical module capable of monitoring emitted light of light-emitting elements.

2. Description of the Related Art

In an optical communication system, there is an optical module that serves to monitor LD-emitted light.

Figure 16:
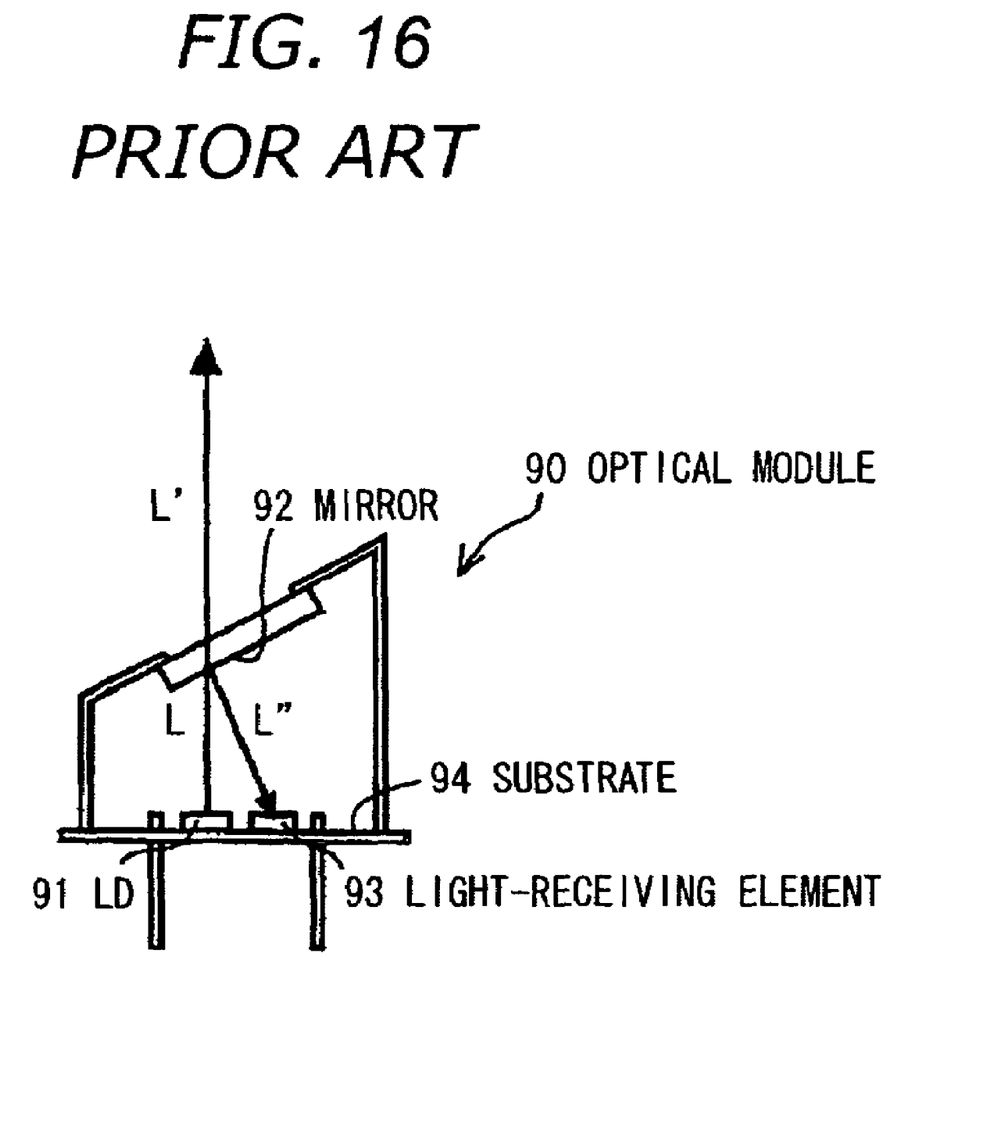
FIG. 16 is a cross-sectional view showing a conventional optical module.

FIG. 16 shows a conventional optical module 90 that comprises a laser diode (LD) 91, a mirror 92 provided at a specified angle to the light-emitting plane of the LD for allowing an optical signal to be transmitted through but partially reflected off the mirror, and a monitoring light-receiving element array 93 for receiving an optical signal reflected off the mirror 92 (See JP-A-2002-107582, for example). The monitoring light-receiving element array 93 is provided on a substrate 94 on which is packaged the LD 91. The mirror 92 is formed of a glass plate that reflects a few percents of LD-emitted light, and is arranged so that an incident angle of the optical signal on the glass plate is below a critical angle to allow most of the LD-emitted light to be transmitted therethrough.

Most (L' in the figure) of an optical signal L for communication emitted from the LD 91, is transmitted through the glass plate, and a few percents thereof (L" in the figure) are reflected off it. The reflected light L" is received by the monitoring light-receiving element array 93 provided in the reflection direction.

Since a few percents of the optical signal emitted from the LD 91 are reflected and detected, it is possible to monitor whether the LD 91 is operating normally.

Because the optical module of FIG. 16 is a one-channel optical module with one monitoring light-receiving element that receives an optical signal emitted from one LD and its monitored light, it cannot be applied to an optical module with an LD array comprising plural LDs arrayed in parallel to each other to emit plural optical signals.

Because it is generally difficult to emit light rearwards from a surface emitting LD, light emitted forwards has to be separated with some method into an optical signal for communication and an optical signal to be monitored. A method, which causes reflection by providing a glass plate in front of the surface emitting LD, causes expansion of the spot of the light returned by being reflected off the glass plate. Particularly, in a parallel transceiver with plural LDs arranged at a narrow pitch, there is the problem that optical signals to be monitored interfere with each other between mutually adjacent channels.

This therefore makes it impossible to discretely monitor respective optical signals emitted from the LDs of the LD array. In the optical module that transmits/receives optical signals of the multichannel, it is impossible to monitor the optical signal emitted from each light-emitting element, to determine which channel is malfunctioning.

SUMMARY OF THE INVENTION

Accordingly, it is an object of the present invention to provide an optical module, which is capable of obviating the above problems, and of monitoring optical signals of plural light-emitting elements.

According to the present invention, an optical module comprises:

a light-emitting element array comprising plural light-emitting elements arrayed in parallel to each other;

a mirror provided at a specified angle to the optical axis of the light-emitting element array, the mirror allowing optical signals emitted from the light-emitting elements to be transmitted through but partially reflected off the mirror;

a monitoring light-receiving element array comprising monitoring light-receiving elements arrayed in parallel to the light-emitting element array, the monitoring light-receiving element array monitoring reflected light of each light-emitting element of the light-emitting element array; and a convex lens interposed between the mirror and the light-emitting element array, the convex lens having an effective diameter larger than the distance between the respective optical axes of the mutually most-distant two light-emitting elements of the light-emitting element array, the convex lens causing the incident optical signals from the light-emitting elements of the light-emitting element array to respectively form parallel light, and causing their respective optical axes to cross each other on or adjacent to the surface of the mirror, to emit plural optical signals reflected off the mirror, and make the respective optical axes of the emitted optical signals parallel to each other to collect the parallel optical signals into the monitoring light-receiving elements respectively.

In the above invention, the following modifications and changes can be made.

(i) The mirror is inclined at an angle to the optical axis of the light-emitting element array, and the light-emitting element array is provided in the central axis of the convex lens.

(ii) The mirror is provided perpendicularly to the optical axis of the light-emitting element array, and the optical axis of the light-emitting element array is provided so as to be shifted from the central axis of the convex lens.

(iii) The optical module further comprises:

a block formed of a plastic material; and a slit formed in the block, the slit forming the mirror, wherein the convex lens is formed on one side of the block to face the light-emitting element array.

(iv) The optical module further comprises:

another convex lens formed on the opposite side of the block to the convex lens, the another convex lens collecting optical signals transmitted through the mirror into plural optical transmission lines respectively that are connected to the block.

(v) The optical module further comprises:

a lens hole formed on one side of the block, the lens hole having an aperture substantially equal to an aperture of the another convex lens, and a specified depth, wherein the another convex lens is formed at the deepest of the lens hole, and the focus of the another convex lens is positioned in an aperture plane.

(vi) The optical module further comprises:

a half mirror inserted in the slit, the half mirror having an arbitrary reflectance.

(vii) The optical module further comprises:

an adhesive having the same refractive index as a refractive index of a material that forms the block, wherein a gap between the mirror surface of the slit and the half mirror is filled with the adhesive.

ADVANTAGES OF THE INVENTION

The present invention exhibits the excellent effect of being able to monitor optical signals of plural light-emitting elements.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
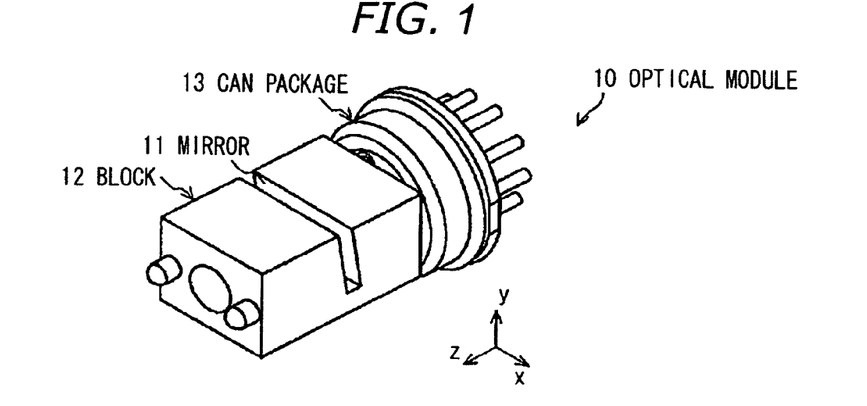
FIG. 1 is a perspective view showing an optical module in a first preferred embodiment according to the present invention.

FIG. 1 is a perspective view showing an optical module in a first preferred embodiment according to the present invention.

Optical Module Structure

As shown in FIG. 1, an optical module 10 in this embodiment comprises a light-emitting element array with plural light-emitting elements arrayed in parallel to each other; a monitoring light-receiving element array provided adjacent to the light-emitting element array for monitoring reflected light of each light-emitting element of the light-emitting element array; and a block 12 with a mirror 11 formed to allow optical signals emitted from light-emitting elements to be transmitted through but partially reflected off the mirror 11.

The light-emitting element array and the monitoring light-receiving element array are provided on a CAN package 13, and the CAN package 13 is joined to the block 12.

CAN Package Structure

Figure 2:
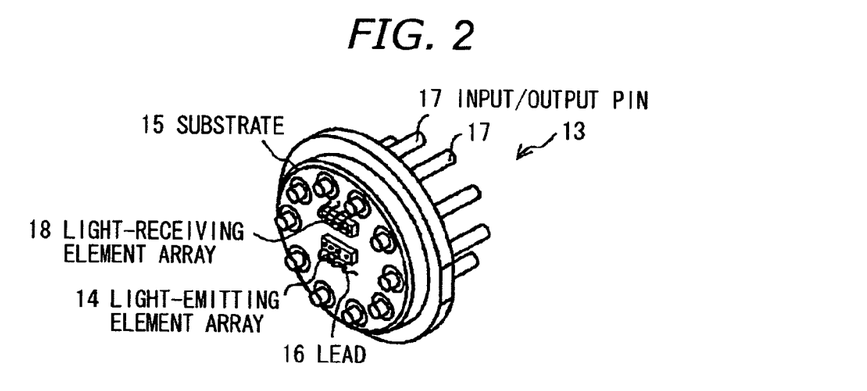
FIG. 2 is a perspective view showing a CAN package of FIG. 1.

As shown in FIG. 2, in the CAN package 13, a light-emitting element array 14 is provided on a disc substrate 15, and is electrically connected to an electrical wiring pattern formed on the substrate 15 via leads 16. Further, for external electrical connection of the light-emitting element array 14, there are provided multiple input/output pins 17 that pass through the substrate 15. Likewise, a monitoring light-receiving element array 18 is provided on the same substrate 15.

Light-emitting Element Array Structure

Figure 3:
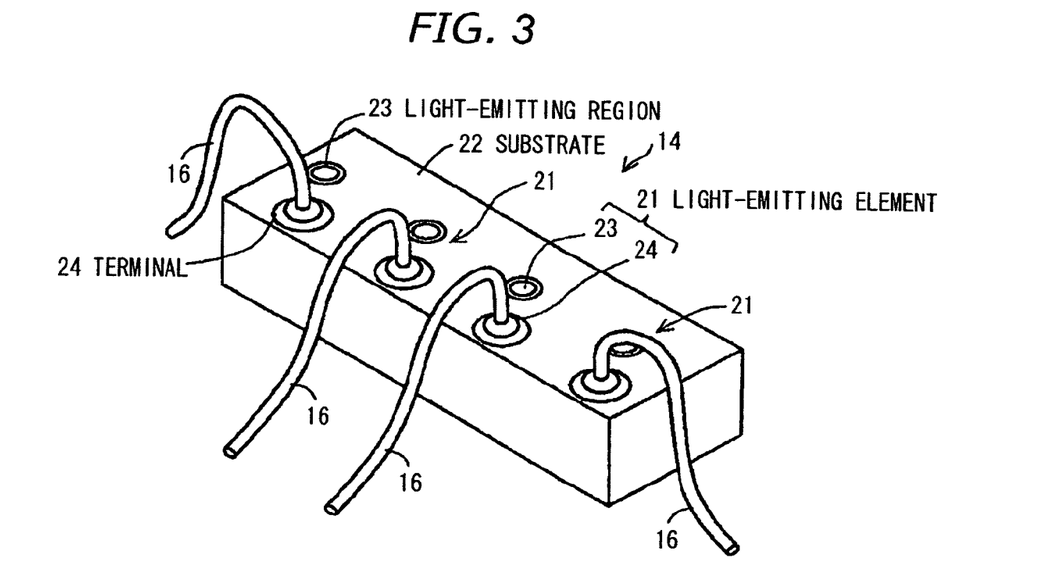
FIG. 3 is a perspective view showing a light-emitting element array of FIG. 2.

As shown in FIG. 3, in this embodiment, the light-emitting element array 14 comprises four light-emitting elements 21 arrayed one-dimensionally to transmit optical signals with four channels. The light-emitting elements 21 use a surface emitting laser diode (LD). In this embodiment, the light-emitting elements 21 are provided in a substrate 22, and comprise a set of light-emitting regions 23 and terminals 24 for receiving leads 16 for electrically connecting the light-emitting regions 23, respectively. The monitoring light-receiving element array 18 comprises the same number of monitoring light-receiving elements. The monitoring light-receiving elements use a PD array with four photodiodes arrayed one-dimensionally.

Block Structure

Now, there is explained the block 12 with a mirror formed in the optical module in this embodiment.

Figure 4A:
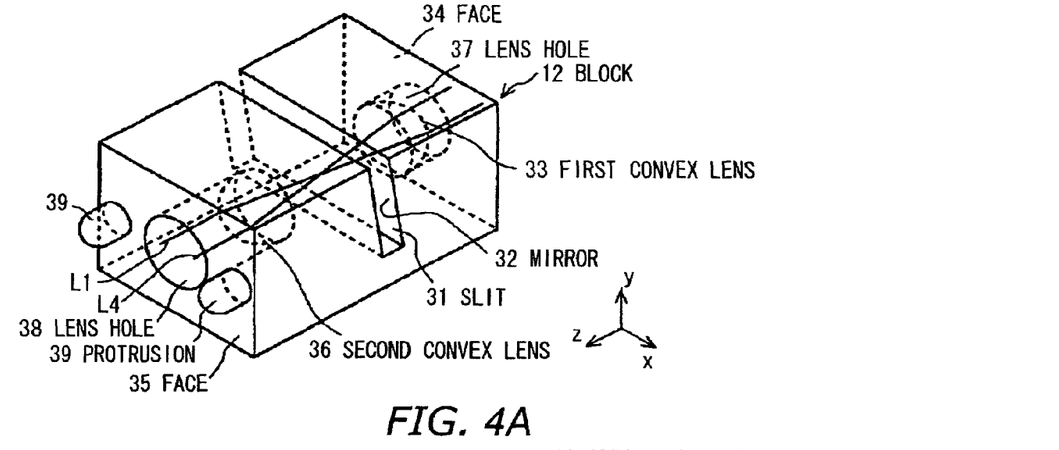
FIGS. 4A-4C are respectively a perspective view showing a block of FIG. 1, a (partially schematic) top view showing the optical module of FIG. 1, and a (partially schematic) side view showing the optical module of FIG. 1.
Figure 4B:
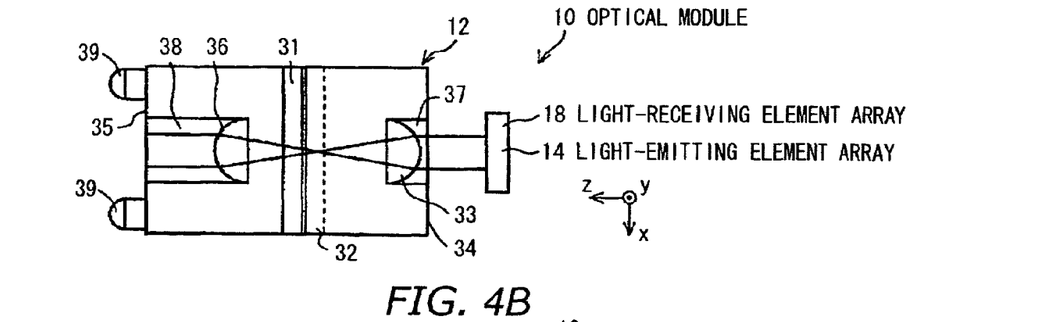
Figure 4C:
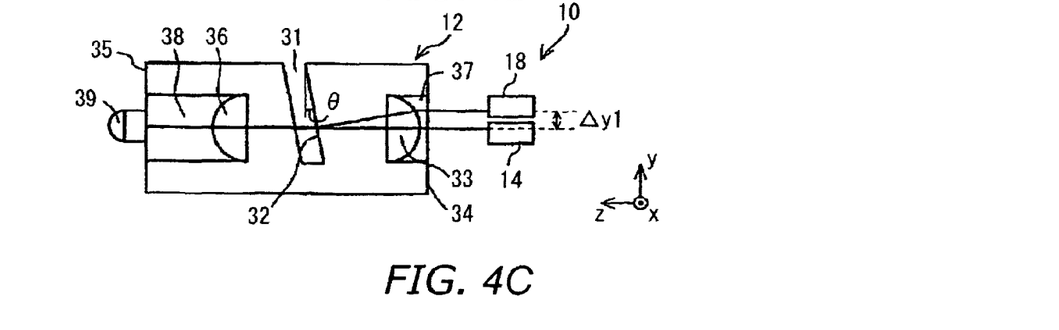

As shown in FIGS. 4A-4C, the block 12 is formed in a substantially rectangular parallelepiped, using a plastic material. As shown in FIG. 4C, the block 12 is formed with a slit 31 having a specified angle to the optical axis of the light-emitting element array 14. The slit 31 is filled with air. The boundary between the slit 31 and the block 12, i.e., the slit plane, is caused to form a mirror 32. To allow most of optical signals emitted from the light-emitting element array 14 to be transmitted through the mirror 32, the mirror 32 is formed at an angle (below a critical angle) that causes no total reflection.

In this embodiment, forming the boundary (the mirror 32) between the plastic material forming the block 12 and the air in the slit 31 at a specified angle to the optical axis of the optical signals, allows the reflectance to be substantially 4%. That is, optical signals to be monitored that are emitted from the light-emitting elements 21 are reflected towards the monitoring light-receiving elements at 4% optical intensity ratio.

Further, the block 12 is formed with two convex lenses, a first convex lens 33 formed in one face 34 of the block 12 between the mirror 32 and the light-emitting element array 14, and a second convex lens 36 formed in opposite face 35 of the block 12 to the face 34 in which is formed the first convex lens 33. Also, the first convex lens 33 is formed to face the light-emitting element array 14 and the monitoring light-receiving element array 18. The first and second convex lenses 33 and 36 are formed integrally of the same material as that of the block 12, which also forms the block portion between the first and second convex lenses 33 and 36.

The first convex lens 33 has a convex side that faces the light-emitting element array 14. The first convex lens 33 has an effective diameter larger than a distance between the optical axes of the mutually most-distant light-emitting elements 21 and 21 of the light-emitting element array 14. The first convex lens 33 is arranged so that the center of the light-emitting element array 14 (the center between the optical axes of the most-distant light-emitting elements) is positioned in the optical axis (middle) of the first convex lens 33, as shown in FIG. 4C. It is preferable that the second convex lens 36 also has a convex side that faces an optical waveguide array (e.g., optical fiber array) 42 comprising plural optical transmission lines (e.g., optical fibers) 41 connected to the optical module 10, and has an effective diameter larger than a distance between the optical axes of the mutually most-distant two optical fibers 41 of the optical fiber array 42. The second convex lens 36 is used for collecting optical signals into the plural optical fibers 41 respectively connected to the block 12.

In this embodiment, in one face 34 of the block 12 is formed a columnar lens hole 37 substantially equal to the aperture of the first convex lens 33, and at the deepest (at the bottom) of the lens hole 37 is provided the first convex lens 33. Likewise, in the opposite face 35 of the block 12 is formed a same-shape lens hole 38, and at the deepest of the lens hole 38 is provided the second convex lens 36.

Figure 5:
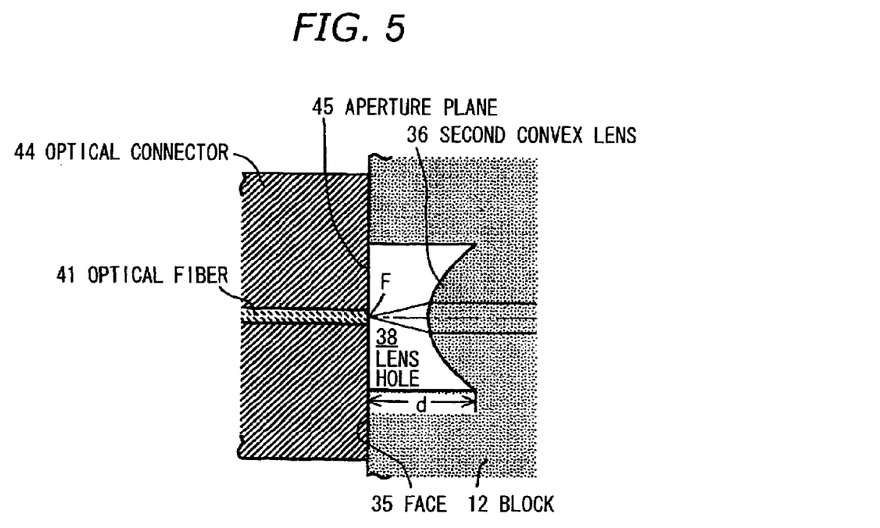
FIG. 5 is a cross-sectional view showing connection between the block of FIG. 4 and an optical connector.

As shown in FIG. 5, the lens hole 38 is formed by adjusting depth d to position the focus F of the second convex lens 36 in an aperture plane 45 of the lens hole 38. This allows the focus of the second convex lens 36 to be positioned in the end face of the optical fiber 41 connected to an optical connector 44, only by bringing the optical connector 44 connected to the optical fiber 41, into contact with the face 35 of the block 12.

Also, returning to FIG. 4A, in the face 35 of the block 12 in which is formed the second convex lens 36, there is formed (in FIG. 4A, two) engagement projections 39 for being connected to the optical connector 44. Accordingly, only by causing the engagement projections 39 of the block 12 to engage engagement grooves (not shown) formed in the optical connector 44, without core alignment, the optical axes of optical signals L1-L4 are respectively aligned with the optical fibers 41, to enable the optical connector 44 to be connected to the block 12.

As shown in FIGS. 4B and 4C, the monitoring light-receiving element array 18 is arranged in parallel to the light-emitting element array 14. Here, the "parallel" means that the monitoring light-receiving elements are arrayed in parallel to and in one-to-one correspondence with the light-emitting elements 21 respectively so that the light-receiving end face (optical axis) of the monitoring light-receiving element array 18 is substantially parallel to light-emitting end face (optical axis) of the light-emitting element array 14, and that the straight line in which the plural light-emitting elements 21 are aligned is parallel to the straight line in which the plural monitoring light-receiving elements are aligned.

In this embodiment, the mirror 32 is provided to be inclined at an angle θ to the optical axis of the light-emitting element array 14. The light-emitting element array 14 is provided in the central axis of the first convex lens 33. The spacing Δy1 between the light-emitting elements and the monitoring light-receiving elements is determined by the distance between the first convex lens 33 and the mirror 32, and the angle θ of the mirror 32 to the optical axis of the light-emitting element array.

Figure 6:
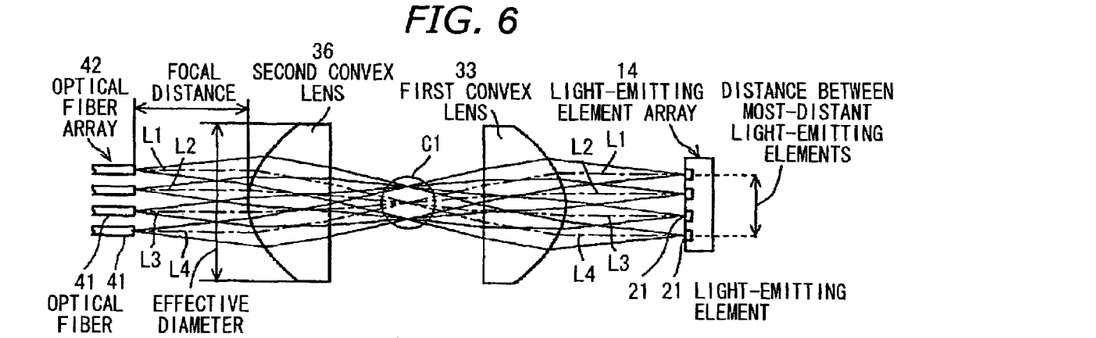
FIG. 6 is a plan view showing optical signal propagation.

Further, as shown in FIG. 6, the pair of the first and second convex lenses 33 and 36 are formed to cause plural optical signals L1-L4 to propagate through optical paths as will be explained below.

In FIG. 6, on the second convex lens 36 side is provided the optical fiber array 42 comprising plural optical fibers 41 for receiving optical signals. Optical signals L1-L4 are emitted from the plural light-emitting elements 21 positioned on the first convex lens 33 side towards the optical fiber array 42.

Also, because the optical module 10 of this embodiment, which has the mirror 32 formed between the first and second convex lenses 33 and 36, allows most of optical signals (at optical intensity ratio) emitted from the light-emitting elements 21 to be transmitted through the mirror 32, optical communication signal propagation through the mirror 32 is explained in FIG. 6.

Respective optical signals L1-L4 emitted from the light-emitting elements 21 expand their beam diameter to be passed into the first convex lens 33. The optical signals L1-L4 are refractively changed at the boundary of the first convex lens 33 and passed therethrough. The optical signals L1-L4 passed through the first convex lens 33 are deflected to be parallel to their respective optical axes (principal light rays (alternate long and short dash lines shown in FIG. 6)) to be passed to the second convex lens 36. In this case, of the plural optical signals L1-L4, the optical signal that enters the more outer side of the first convex lens 33 has a larger optical axis deflection angle (propagation angle), and the optical signal that is closer to the center of the first convex lens 33 has a smaller optical axis deflection angle. Accordingly, the plural optical signals L1-L4 passed through the first convex lens 33 to respectively form parallel light cross each other substantially in one area (indicated by circle C1 in the figure).

The plural optical signals L1-L4 that respectively propagate to form parallel light are refractively changed at the second convex lens 36 so that the optical axes of the collimated parallel light are made parallel to each other in the second convex lens 36, and the signals L1-L4 are passed through the second convex lens 36 so that each parallel light is respectively collected to the end faces of the optical fibers 41.

Figure 7:
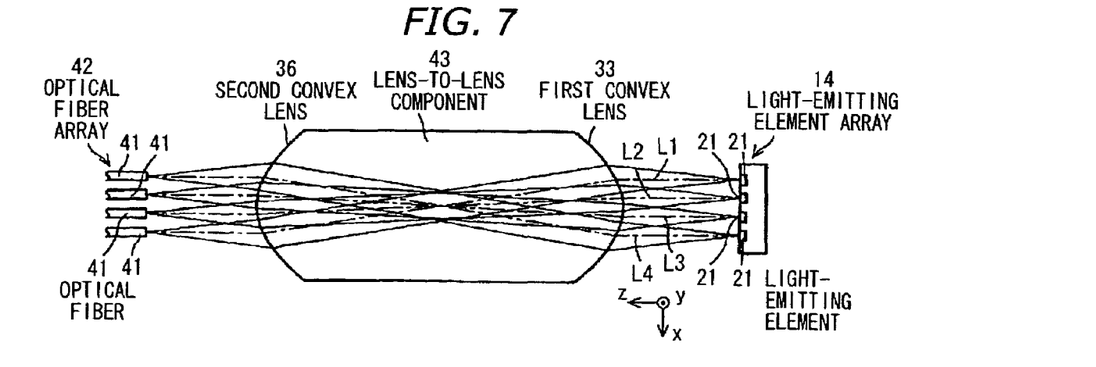
FIG. 7 is a top view showing optical signal propagation through the block of FIG. 4.

In the optical module 10 of this embodiment, the first and second convex lenses 33 and 36, and the portion therebetween are formed of the same refractive index medium (herein, plastic material), and light propagation is shown in FIG. 7 so that the plural optical signals L1-L4 propagate from the light-emitting elements 21 to the optical fibers 41 in substantially the same manner as in FIG. 6.

Figure 8:
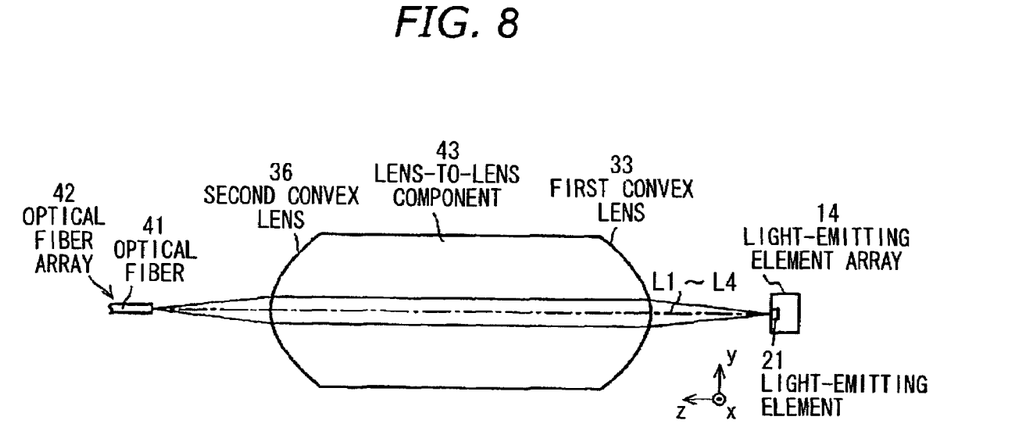
FIG. 8 is a side view showing optical signal propagation through the block of FIG. 4.

As shown in FIG. 8, where FIG. 7 is viewed from the x-axis direction, the plural optical signals L1-L4 propagate as parallel light along the central axis of both the lenses 33 and 36, between the lenses 33 and 36, as indicated by numeral 43.

In the case of a large optical loss allowance, the optical signals L1-L4 between the first and second convex lenses 33 and 36 may be convergent or divergent light.

In the optical module 10 of this embodiment, the optical signals passed through the first convex lens 33 is partially reflected at the mirror 32 formed by the slit 31.

The plural optical signals that have respectively form parallel light at the first convex lens 33 cross each other substantially in one area on or adjacent to the mirror 32. Approximately 4% (optical intensity ratio) of the optical signals is reflected at an angle dependent on an angle of the mirror 32. The reflected plural optical signals (optical signals to be monitored) are passed to the first convex lens 33 while maintaining collimation. It should be noted, however, that the optical signals to be monitored are incident at position different from incidence position on the first convex lens 33 immediately after emission from the light-emitting elements. The plural optical signals to be monitored that have entered the first convex lens 33 are caused to have mutually parallel optical axes, to be collected into the monitoring light-receiving elements.

According to the optical module 10 of this embodiment, it is possible to monitor the plural optical signals to be monitored discretely. That is, by forming the first convex lens 33 to cause the optical axes of the plural optical signals to cross each other and cause each optical signal to form parallel light, and by causing optical signals transmitted through the first convex lens 33 to be reflected at the mirror 32 to thereby generate optical signals to be monitored, to be retransmitted through the first convex lens 33, the respectively collected optical signals to be monitored can reach the parallel plural monitoring PDs, which therefore makes it possible to receive the optical signals to be monitored that correspond to the LDs 21 respectively. Because this optical module 10 causes no diametrical expansion of the optical signals to be monitored passed to the monitoring PDs, the plural monitoring PDs 21 arrayed at a narrow pitch can receive only the respective target optical signals to be monitored, while being prevented from receiving (crosstalk) of other optical signals to be monitored.

Also, this optical module 10 only uses the block 12 formed with the first convex lens 33 and the slit 31, but requires no new lens for detecting the optical signals to be monitored, which makes it possible to form optical paths for the plural optical signals to be monitored with a small number of components.

Figure 9:
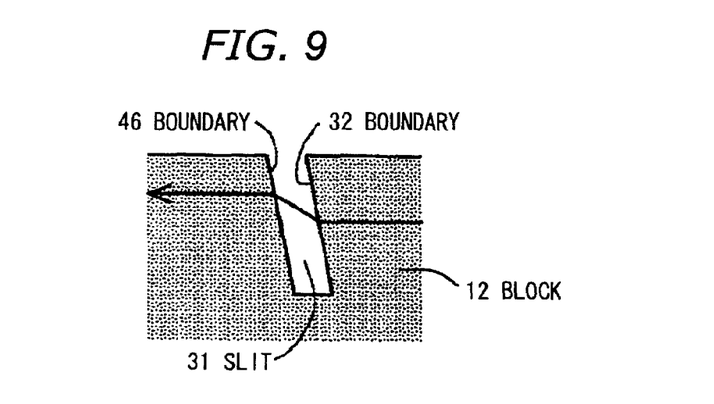
FIG. 9 is a cross-sectional view showing detail of optical signal propagation through a slit.

Although in FIGS. 4A-4C, optical signals transmitted through the slit 31 are shown in one straight line, as shown in FIG. 9, in practice, the slit 31 formed between the first and second convex lenses 33 and 36 causes the optical signals to propagate so as to be refractively changed when passed through the boundary of the slit. Specifically, mutually opposite boundaries 32 and 46 of the slit 31 are formed in parallel to each other, and a refractive angle in passing from the block 12 to the slit 31 is equal to a refractive angle in passing from the slit 31 to the block 12, so that there is a parallel relationship between the optical axes of the optical signal incident on the slit 31 and the optical signal deflected through the slit 31. It is therefore preferable that the second convex lens 36 is provided so as to be shifted in parallel to the first convex lens 33 by an optical-axis-deflected distance.

Second Embodiment

Next, an optical module of a second preferred embodiment is explained.

Optical Module Structure

Its basic structure is substantially similar to that of the optical module 10 of FIG. 1 described above. While the optical module 10 of this embodiment has the light-emitting element array 14 with plural one-dimensionally arrayed photoelectric elements 21, the optical module of this second embodiment is different therefrom in having a photoelectric element array 51 with plural two-dimensionally arrayed photoelectric elements 21.

Light-emitting Element Array Structure

Figure 10:
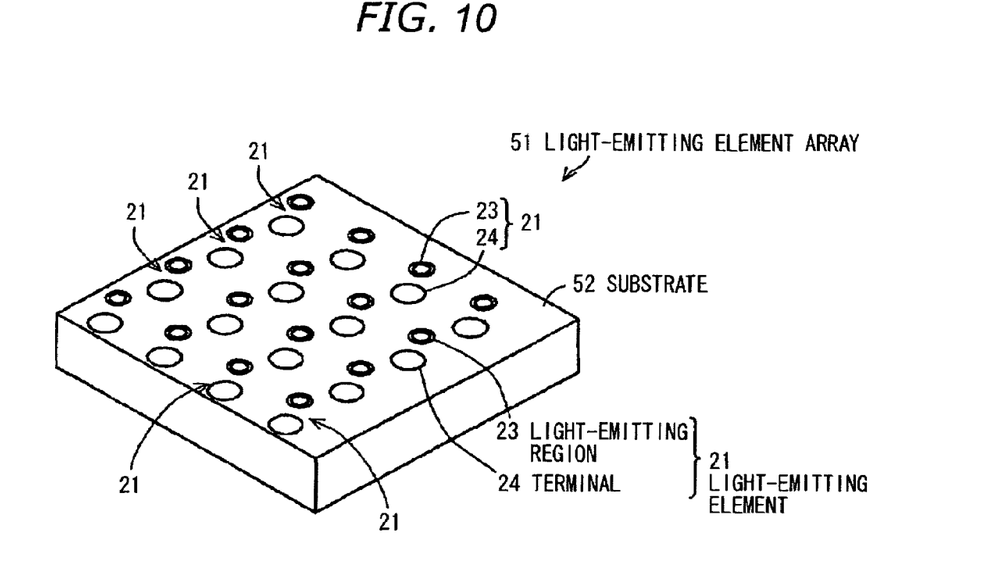
FIG. 10 is a perspective view showing a light-emitting element array of an optical module in a second preferred embodiment according to the present invention.

FIG. 10 shows the light-emitting element array 51 of this embodiment in which two-dimensionally (4 wide×4 deep) arrayed LDs 21 comprising a set of light-emitting regions 23 and terminals 24 are packaged in a substrate 52. A monitoring light-receiving element array 18 (see FIG. 2) is formed with two-dimensionally (4 wide×4 deep) arrayed monitoring PDs.

In the optical module of this embodiment, with the two-dimensionally arrayed light-emitting elements 21, plural optical signal propagation is similar to that of the previous embodiment. It is possible to detect monitored optical signals with the monitoring light-receiving elements corresponding to the light-emitting elements respectively. The optical module of this embodiment therefore can be easily applied to further multi-channel optical modules.

Third Embodiment

Next, an optical module of a third preferred embodiment is explained.

Optical Module Structure

Its basic structure is substantially similar to that of the optical module 10 of FIG. 1-FIG. 4C described above. The same structural portions are denoted by the same characters as in FIG. 1-FIG. 4C.

Figure 11:
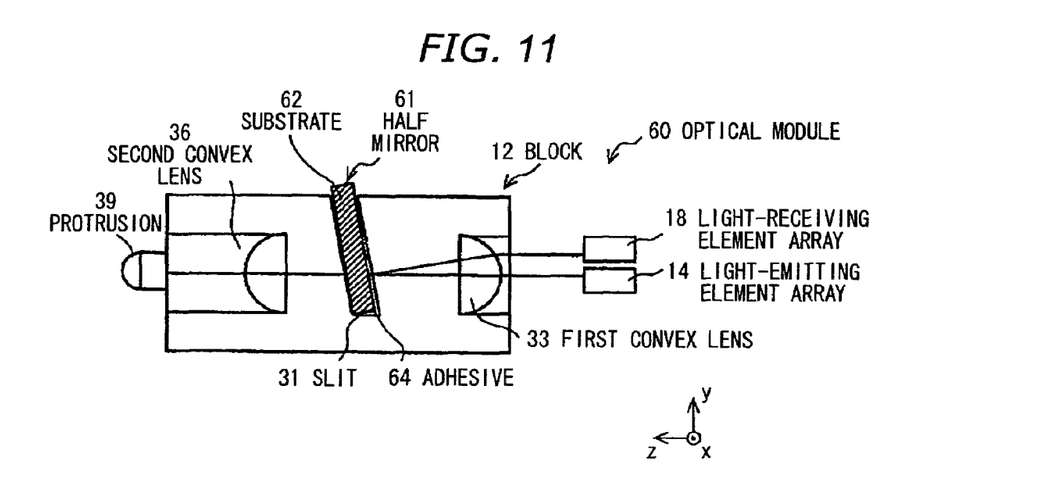
FIG. 11 is a (partially schematic) side view showing an optical module in a third preferred embodiment according to the present invention.

As shown in FIG. 11, the optical module 60 of this embodiment is different in that a half mirror 61 is inserted in the slit 31 of the optical module 10 of FIG. 4.

The half mirror 61 has a mirror film (a metallic or dielectric thin film) applied to the surface of a substrate 62. The transmittance (reflectance) of an optical signal may optionally be selected according to the material of the mirror film.

It is preferred that the substrate 62 of the half mirror 61 is formed of a material whose refractive index is equal to that of a material that forms the block 12. The refractive index in the slit 31 (the half mirror) being the same as that of the block 12 allows optical signals transmitted through the slit 31 to go straight without refraction. Thus, the second convex lens 36 is provided so that the optical axis of the second convex lens 36 is aligned with the optical axis of the first convex lens 33, which allows facilitating convex lens design formed in the block 12.

Also, the gap in the slit in which is inserted the half mirror 61 is filled with adhesive 64 whose refractive index is the same as that of the material that forms the block 12. By being filled with adhesive 64, it is possible to prevent excessive reflection and refraction.

Fourth Embodiment

Next, an optical module of a fourth preferred embodiment is explained.

Optical Module Structure

The optical module of this embodiment is different from the optical module of the first embodiment in that a mirror is provided perpendicularly to the optical axis of the light-emitting element array, and that the optical axis of the light-emitting element array is provided so as to be shifted from the central axis of the first convex lens.

Figure 12:
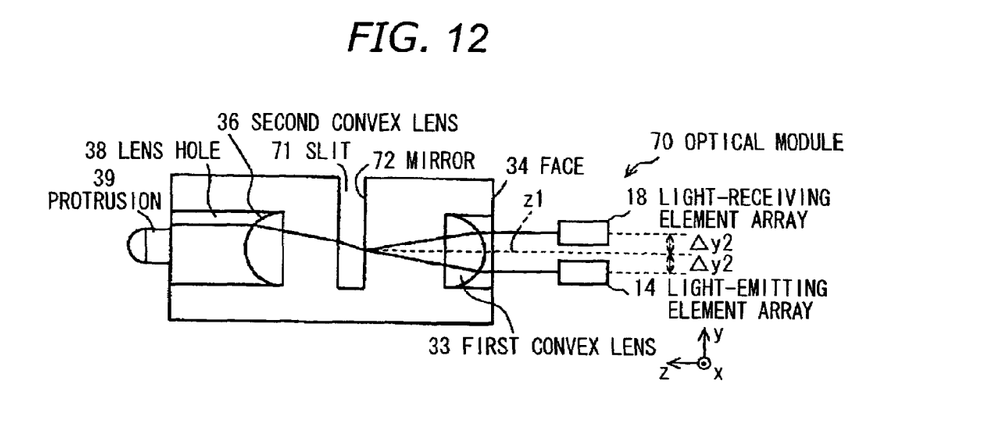
FIG. 12 is a (partially schematic) side view showing an optical module in a fourth preferred embodiment according to the present invention.

As shown in FIG. 12, a slit 71 of an optical module 70 is formed perpendicularly to the central axis z1 of a first convex lens 33. A light-emitting element array 14 is arranged so as to be offset by a specified amount from the central axis z1 of the first convex lens 33. A monitoring light-receiving element array 18 is arranged so as to be offset opposite the light-emitting element array 14 from the central axis z1 of the first convex lens 33. An offset amount Δy2 of the light-emitting element array 14 from the central axis z1 of the first convex lens 33 is equal to an offset amount Δy2 of the monitoring light-receiving element array 18 from the central axis z1 of the first convex lens 33. The offset amount Δy2 is determined to be an amount or less that causes at mirror 32 no total reflection of optical signals L1-L4 emitted from the light-emitting element array 14. That is, the offset amount Δy2 is set so that the incident angle of the optical signals L1-L4 refracted by the first convex lens 33, on the mirror 32, is below a critical angle.

Figure 13:
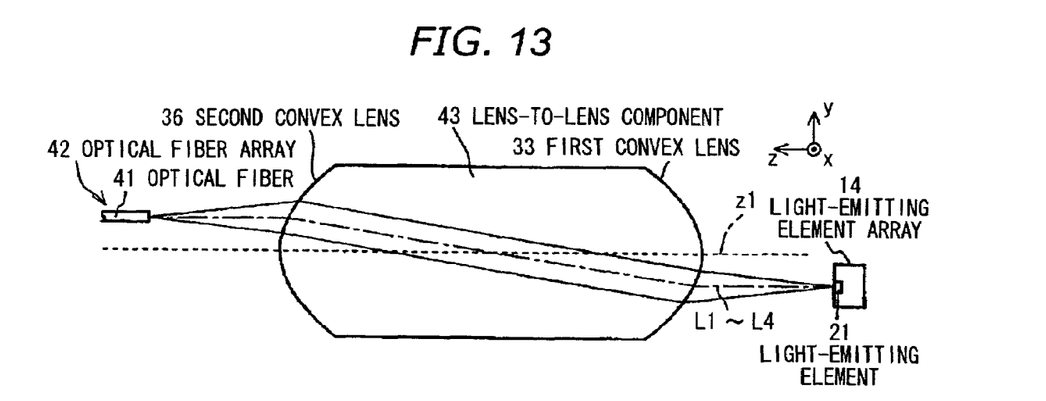
FIG. 13 is a side view showing an optical path of an optical signal for communication in the optical module of FIG. 12.

As shown in FIG. 13, respective optical signals L1-L4 emitted from the light-emitting elements 21 expand their beam diameter to be passed into the first convex lens 33. In this case, unlike the case of FIG. 8, the optical signals L1-L4 are incident thereon so as to be parallel to the central axis z1 of the first convex lens 33 and be deflected from the central axis z1. The optical signals L1-L4 are refractively changed at the first convex lens 33 to deflect their optical axes, to form parallel light to be passed to the second convex lens 36. The optical signals L1-L4 that have formed parallel light are incident on the opposite side to the central axis z1 of the second convex lens 36 and are refractively changed at the second convex lens 36, to make the optical axes of the parallel light parallel to each other, and the signals L1-L4 are passed through the second convex lens 36 so that each parallel light is respectively collected to the end faces of the optical fibers 41. In FIG. 13, although no mirror is formed between the first and second convex lenses 33 and 36, most (approx. 96%) of the optical signals L1-L4 is, in practice, transmitted through a mirror to be passed into the second convex lens 36.

Figure 14:
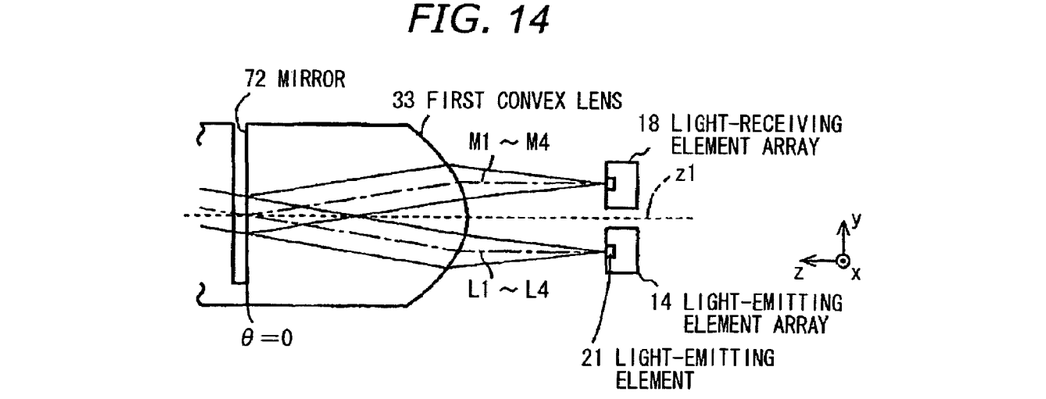
FIG. 14 is a side view showing an optical path of an optical signal for monitoring in the optical module of FIG. 12.
Figure 15A:
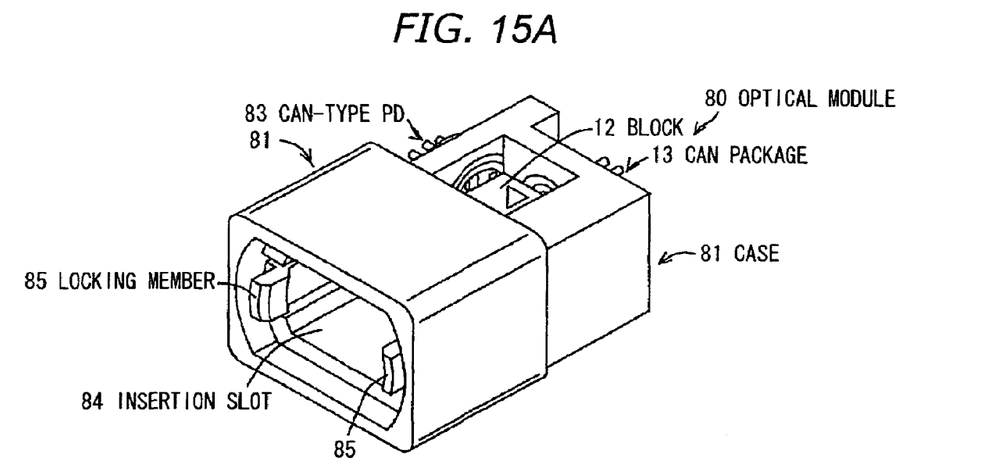
FIGS. 15A-15D are respectively a forward perspective view, a rearward perspective view, a front view, and a top view, showing an optical module in a fifth preferred embodiment according to the present invention.
Figure 15B:
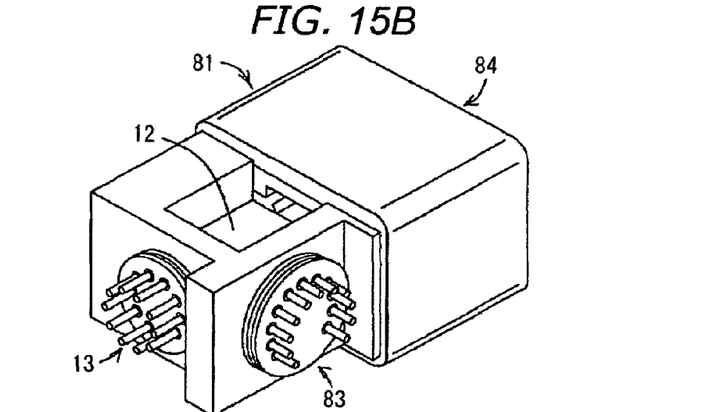
Figures 15C, 15D:
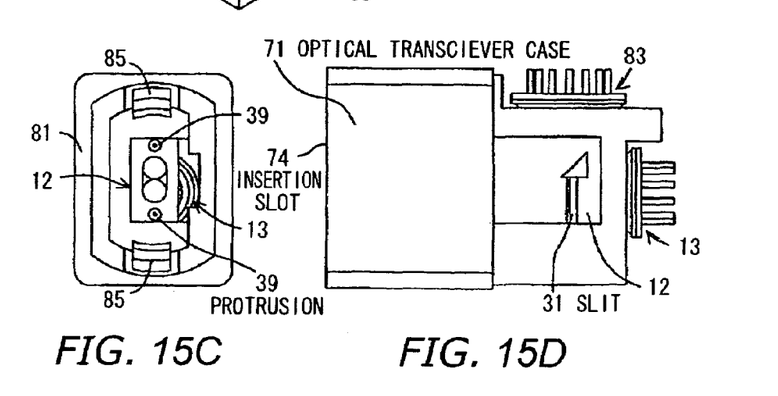

Also, as shown in FIG. 14, the optical signals L1-L4 are refractively changed at the first convex lens 33, they are incident on a mirror 72 at a specified incident angle even when the mirror 72 is formed perpendicularly (θ=0) to the optical axis of the light-emitting element array 21, so that their reflected light is optical signals M1-M4 to be monitored.

The optical signals M1-M4 to be monitored are again passed into the first convex lens 33 and are refractively changed at the first convex lens 33 to make the respective optical axes of the optical signals M1-M4 to be monitored parallel to each other, and are respectively collected into the monitoring light-receiving elements.

In the optical module 70 of this embodiment, by causing the monitoring light-receiving element array 18 and the light-emitting element array 14 to be offset by the same amount relative to the central axis z1 of the first convex lens 33, and to be arranged at the equal distance from the first convex lens 33, and by forming the mirror 72 perpendicularly to the optical axis of the light-emitting element array 21, it is possible to receive, with the monitoring light-receiving elements, the optical signals M1-M4 to be monitored that are formed by partial reflection, at the mirror 72, of the optical signals L1-L4 emitted from the light-emitting elements 21 respectively. Accordingly, the optical module 70 of this embodiment has the effect similar to that of the optical module of the first embodiment.

In the optical module 70 of this embodiment, a half mirror may also be inserted in the slit 71, as in the optical module of the third embodiment.

Fifth Embodiment

Next, an optical module of a fifth preferred embodiment is explained.

Optical Module Structure

As shown in FIGS. 15A-15D, an optical module 80 of this embodiment includes an optical transceiver case 81 for accommodating a block 12, and a CAN package 13 (a CAN-type LD) comprising a light-emitting element array 14 and a monitoring light-receiving element array 18 and being attached to an outer side of the optical transceiver case 81. Specifically, the optical module 80 includes the case 81 in which is accommodated the block 12 of FIG. 4A, and the CAN-type LD 13 attached to the case 81 opposite a first convex lens 33 of the block 12, where the block 12 and the light-emitting element array 14 are optically connected to each other.

Also, this optical module 80 includes an optical communication light-receiving element array (a PD array). The block 12 has another convex lens formed opposite the light-receiving elements. Similarly to the light-emitting element array 14, the optical communication light-receiving element array is provided as a CAN-type PD 83 which is attached to a perpendicular side to the CAN-type LD 13 of the case 81. An insertion slot 84 is used for inserting a multicore connector to which plural optical fibers are connected, and a locking member 85 is used for fixing the inserted multicore connector in the optical transceiver case 81.

The optical module 80 of this embodiment, which also comprises the block 12 formed with a slit 31, the light-emitting element array and the monitoring light-receiving element array provided in the CAN package 13, has the effect and advantage similar to those of the optical module of the first embodiment.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
    a light-emitting element array comprising plural light-emitting elements arrayed in parallel to each other;
    a mirror provided at a specified angle to the optical axis of the light-emitting element array, the mirror allowing optical signals emitted from the light-emitting elements to be transmitted through but partially reflected off the mirror;
    a monitoring light-receiving element array comprising monitoring light-receiving elements arrayed in parallel to the light-emitting element array, the monitoring light-receiving element array monitoring reflected light of each light-emitting element of the light-emitting element array; and a convex lens interposed between the mirror and the light-emitting element array, the convex lens having an effective diameter larger than the distance between the respective optical axes of the mutually most-distant two light-emitting elements of the light-emitting element array, the convex lens causing the incident optical signals from the light-emitting elements of the light-emitting element array to respectively form parallel light, and causing their respective optical axes to cross each other on or adjacent to the surface of the mirror, to emit plural optical signals reflected off the mirror, and make the respective optical axes of the emitted optical signals parallel to each other to collect the parallel optical signals into the monitoring light-receiving elements respectively.

2. The optical module according to claim 1, wherein:
the mirror is inclined at an angle to the optical axis of the light-emitting element array, and
the light-emitting element array is provided in the central axis of the convex lens.

3. The optical module according to claim 1, wherein:
the mirror is provided perpendicularly to the optical axis of the light-emitting element array, and
the optical axis of the light-emitting element array is provided so as to be shifted from the central axis of the convex lens.

4. The optical module according to claim 1, further comprising:
a block formed of a plastic material; and
a slit formed in the block, the slit forming the mirror, wherein the convex lens is formed on one side of the block to face the light-emitting element array.

5. The optical module according to claim 4, further comprising:
another convex lens formed on the opposite side of the block to the convex lens, the another convex lens collecting optical signals transmitted through the mirror into plural optical transmission lines respectively that are connected to the block.

6. The optical module according to claim 5, further comprising:
a lens hole formed on one side of the block, the lens hole having an aperture substantially equal to an aperture of the another convex lens, and a specified depth,
wherein the another convex lens is formed at the deepest of the lens hole, and the focus of the another convex lens is positioned in an aperture plane.

7. The optical module according to claim 4, further comprising:
a half mirror inserted in the slit, the half mirror having an arbitrary reflectance.

8. The optical module according to claim 7, further comprising:
an adhesive having the same refractive index as a refractive index of a material that forms the block,
wherein a gap between the mirror surface of the slit and the half mirror is filled with the adhesive.

* * * * *